US011931748B2

(12) United States Patent
Rem et al.

(10) Patent No.: US 11,931,748 B2
(45) **Date of Patent: *Mar. 19, 2024**

(54) MAGNETIC DENSITY SEPARATION DEVICE AND METHOD

(71) Applicant: Urban Mining Corp. B.V., Rotterdam (NL)

(72) Inventors: Peter Carlo Rem, Rotterdam (NL); Simon Peter Maria Berkhout, Rotterdam (NL)

(73) Assignee: Urban Mining Corp. B.V., Rotterdam (NL)

( * ) Notice: Subject to any disclaimer, the term of this patent is extended or adjusted under 35 U.S.C. 154(b) by 299 days.

This patent is subject to a terminal disclaimer.

(21) Appl. No.: 17/192,954

(22) Filed: Mar. 5, 2021

(65) Prior Publication Data

US 2021/0187516 A1 Jun. 24, 2021

Related U.S. Application Data

(63) Continuation of application No. 15/026,809, filed as application No. PCT/NL2014/050685 on Oct. 3, 2014, now Pat. No. 10,974,255.

(30) Foreign Application Priority Data

Oct. 4, 2013 (NL) ...................................... 2011559

(51) Int. Cl.
*B03C 1/28* (2006.01)
*B03C 1/32* (2006.01)

(52) U.S. Cl.
CPC ................ *B03C 1/288* (2013.01); *B03C 1/32* (2013.01); *B03C 2201/18* (2013.01)

(58) Field of Classification Search
CPC ........ B03C 1/288; B03C 1/32; B03C 2201/18
See application file for complete search history.

(56) References Cited

U.S. PATENT DOCUMENTS 4,052,297 A 10/1977 Mir
4,113,608 A 9/1978 Kazama et al.
(Continued)

FOREIGN PATENT DOCUMENTS

CN 101652185 A 2/2010
EP 1800752 A1 6/2007
(Continued)

OTHER PUBLICATIONS

Chinese Office Action and Search Report, Application No. 201480066258.X, dated Apr. 1, 2017.
(Continued)

*Primary Examiner* — Dirk R Bass
(74) *Attorney, Agent, or Firm* — Fishman Stewart PLLC

(57) ABSTRACT

A magnetic density separator comprising a process channel through which in use magnetic process liquid and particles to be separated flow in a flow direction, a magnetization device that is arranged to extend in flow direction along at least one of the walls of the channel so as to in use apply a magnetic field to the process liquid in a separation zone of the channel to establish a cut density of the magnetic process liquid to separate the particles in the process liquid based on their density, a laminator through which the magnetic process liquid is introduced into the channel to flow laminarized in flow direction along the separation zone, and a feed through which a mixture of process liquid and particles to be separated is introduced into the process channel to join the laminarized process liquid, characterized in that the feed includes an entraining device.

13 Claims, 2 Drawing Sheets

(56) References Cited

U.S. PATENT DOCUMENTS

| | | | |
|---|---|---|---|
| 5,762,204 | A | 6/1998 | Yang et al. |
| 2011/0042274 | A1 | 2/2011 | Rem et al. |
| 2011/0049017 | A1 | 3/2011 | Rem et al. |

FOREIGN PATENT DOCUMENTS

| | | | |
|---|---|---|---|
| EP | 1800753 | A | 6/2007 |
| RU | 2136380 | C1 | 9/1999 |
| RU | 2464101 | C1 | 10/2012 |
| WO | 20009108047 | | 9/2009 |

OTHER PUBLICATIONS

Chinese Office Action, Application No. 201480066258.X, dated Apr. 28, 2018 (with English translation).

E.J. Bakker et.al. Turning Magnetic Density, Separation into Green Business Using the Cyclic Innovation Model. The Open Waste Management Journal, 2010, 3, 99-116.

Indian Examination Report, 201617011840, dated Nov. 28, 2018.

European Patent Office; International Search Report and Written Opinion issued in counterpart international application No. PCT/NL2014/050685, dated Jan. 9, 2015.

Domenico Lahaye et al: “Magnet designs for magnetic density separation of polymers”, International Conference on Solid Waste Technology and Management: ICSW; The 25th Conference on Solid Waste, Technology and Management, Philadelphia, PA, Jan. 1, 2011 (Jan. 1, 2011), pp. 977-983, XP008166490, ISSN: 1091-8043.

MAGNETIC DENSITY SEPARATION DEVICE AND METHOD

CROSS-REFERENCE TO RELATED APPLICATIONS

This application is a continuation of U.S. patent application Ser. No. 15/026,809, filed Apr. 1, 2016, which is a national stage filing based upon International PCT Application No. PCT/NL2014/050685, with an international filing date of Oct. 3, 2014, which claims the benefit of priority to NL Application No. NL 2011559, filed Oct. 4, 2013, which applications are fully incorporated herein by reference as though fully set forth herein.

TECHNICAL FIELD

The invention generally relates to magnetic density separation, and in particular a type of magnetic density separation wherein a magnetic field is applied to a magnetic process liquid comprising particles of different density, so as to establish a cut density of the magnetic process liquid and to cause separation of the particles by their density.

BACKGROUND

Magnetic density separation is used in raw materials processing for the classification of mixed streams into streams with particles of different types of materials. In an accurate form of density separation, a liquid medium is used in which the lighter material float and the heavier materials sink. This process uses as a process liquid a liquid medium that has a density that is intermediate between the density of the light and heavy materials in the feed, yet is inexpensive and safe. In magnetic density separation this is provided using a magnetic liquid. The magnetic liquid has a material density which is comparable to that of water. However, when a gradient magnetic field is applied to the magnetic liquid, the force on a volume of the liquid is the sum of gravity and the magnetic force. In this way, it is possible to make the liquid artificially light or heavy, resulting in a so called cut density. For magnetic density separation, use is made of a large planar magnet. The field decays with the height above the magnet, preferably exponentially with the height above the magnet surface.

The known magnetic separation processes are e.g. used to separate particles of different types of plastics that are present in a mixture of recycled, shredded plastic bottles. Known magnetic density separators comprise a process channel through which in use magnetic process liquid and particles to be separated flow in a flow direction. A magnetization device is arranged to extend in flow direction along at least one of the walls of the channel so as to in use apply a magnetic field to the process liquid in a separation zone of the channel to establish a cut density of the magnetic process liquid. The cut density causes separation of the particles in the process liquid based on their density. Known magnetic density separators include a laminator through which the magnetic process liquid is introduced into the channel to flow laminarized in flow direction along the separation zone. By lammerizing the flow of process liquid, swirls in the flow are lessened which may otherwise counteract the density separation. Note that the laminarized flow is herein meant to express that the flow is made substantially laminar, and not necessary the flow is made fully or completely laminar. The separators also include a feed through which a mixture of process liquid and particles to be separated is introduced into the process channel to join the laminarized process liquid.

Such a magnetic density separator is described in WO2009/108047, and a magnetization device with a suited magnetic field is described in EP 1 800 753. In the separator of WO'047, the mixture of process liquid and particles is fed to the laminarized process liquid via jetting channels that extend in flow direction through the laminator. These jetting channels require a relatively high flow speed, as particles to be separated otherwise tend to block the channels. In addition, the particles to be separated are of limited maximum diameter, e.g. 10-15 mm.

Although the known separator is quite successful, a disadvantage of the known separator is that the joining of the mixture of magnetic process liquid with particles to be separated with the laminarized flow of the magnetic process liquid causes swirls in the process liquid. In addition, relatively heavy particles particles that are present as contaminants, e.g. glass or metal, may still cause partial blocking of the jetting channels, and may lead to disturbing swirls in the laminarized process liquid. This reduces the efficiency of separation, and in practice leads to a lower throughput, a relatively long process channel and/or a relatively expensive magnetization device.

SUMMARY

The invention aims to alleviate the disadvantage of the known separator. In particular, the invention aims to provide a magnetic density separator with improved efficiency, and which in practice can have a higher throughput, a relatively short process channel and/or a relatively inexpensive magnetization device. Thereto the invention provides for a magnetic density separator comprising a process channel through which in use magnetic process liquid and particles to be separated flow in a flow direction, a magnetization device that is arranged to extend in flow direction along at least one of the walls of the channel so as to in use apply a magnetic field to the process liquid in a separation zone of the channel to establish a cut density of the magnetic process liquid to separate the particles in the process liquid based on their density, a laminator through which the magnetic process liquid is introduced into the channel to flow laminarized in flow direction along the separation zone, and a feed through which a mixture of process liquid and particles to be separated is introduced into the process channel to join the laminarized process liquid, characterized in that the feed includes an entraining device.

By providing an entraining device in the feed, the mixture of magnetic process liquid with particles to be separated can be joined with the laminarized flow of the magnetic process liquid in a more controlled way, so that the joining causes less swirls in the process liquid. In particular, the entrainment involves a pushing action that prevents blocking, so that the velocity profile of the mixture can be chosen more freely to match the velocity profile of the process liquid, so that the joining of the flows causes less turbulence. The entrainment device is arranged to move with the laminarized flow, preferably with the same velocity as the laminarized flow. In addition, the entrainment itself can cause less turbulence in the mixture. This way, the separation efficiency is improved, and the separator may in practice can have a higher throughput, a relatively short process channel and/or a relatively inexpensive magnetization device.

When the entraining device extends at least partially through the process channel, along with the laminarized flow of process liquid, the mixture may merge gently with the laminarized process liquid. Preferably, the entraining device is arranged to move with the laminarized flow in the same direction.

When the entraining device extends from a supply area where process liquid and particles are intermixed in turbulence, the entraining device itself may counteract that the turbulence at the supply area disturbs the flow in the process channel.

When the feed includes a feed channel that is separate from the laminator, and in which the entraining device is arranged to entrain the mixture axially through the feed channel, the mixture may be pass in parallel along the flow of process liquid through the laminator. This way, the feed channel may be relatively large, and the contact surface of the flows to be joined may be relatively small.

When the entraining device includes entraining elements that engage the walls of the feed channel so as to compartmentalize the mixture in the feed channel between the supply area and the process channel, the entraining device itself may cause less turbulence in the mixture, and may further effectively prevent that turbulence at the supply area disturbs the flow in the process channel. It is particularly effective when the entraining elements sealingly engage the walls of the feed channel.

The entraining device may comprise a conveyor with entraining elements arranged to move along in flow direction. The conveyor is preferably endless and recirculating. The conveyor may extend along channel wall, and may in particular extend along the separation zone. The conveyor may form a wall of the process channel. In case the top wall and the bottom walls are formed by conveyors, the process channel may be substantially formed between the conveyors. This way, the conveyor may also be used to keep the wall free of deposits and debris that is attracted by the magnetization device.

When the entraining elements form transport cradles between them that are open at a side facing the process channel the joining of the mixture with the laminarized flow of process liquid may be particularly effective. In particular, swirls carried along in the transport cradle from the mixing area may help the mixture to exit the cradle at the open side, and to merge the particles to be separated gently with the laminarized process liquid.

When the conveyor is an endless, flat conveyor belt, the entrainment device may be arranged to extend along the wall of the process channel. The entraining elements may then comprise uprights extending from the conveying face of the belt, which are effective an can be implemented relatively easily. The upright entraining elements are preferably flexible. The entrainment elements may e.g. be embodied as brushes, fingers, pushers or similar structures, and are preferably embodied as riffles. When the uprights comprise riffles extending transversely across the face of the conveyor belt, interspaced in movement direction, the forming of transport cradles, and compartmentalization though cooperation of the compartments with the walls of the feed channel is facilitated.

When the feed channel is defined between the laminator and the process channel wall at an entrance of the process channel at the top and or bottom of the process channel it may be implemented relatively simply.

When the conveyor extends along the wall of the process channel in flow direction, and when the entraining elements engage the wall of the laminator, a separator is provided which has a high efficiency, but which is of reliable, cost effective construction. When the conveyor stretches extends across the width of the process channel, the provision of a high throughput of mixture may be facilitated.

The process channel may further include an exit zone comprising at least one dividing wall extending in flow direction, where the process liquid is divided into separate liquid streams in which the particles have mutually different average density.

The invention further relates to a magnetic density separation method, wherein a magnetic field is applied to a magnetic process liquid comprising particles of different density, so as to establish a cut density of the magnetic process liquid and cause separation of the particles by their density, wherein a mixture of magnetic process liquid with particles to be separated is joined to a laminarized flow of the magnetic process liquid using an entrainment device. In the method, the entrainment device moves along with the laminarized flow, and the entrainment device may feed the mixture from a supply area where process liquid and particles are intermixed in turbulence to the laminarized flow in compartmentalized flow.

BRIEF DESCRIPTION OF THE DRAWINGS

The invention will be further elucidated on the basis of a non-limitative exemplary embodiment which is represented in a drawing. In the drawing.

It is noted that the figures are merely schematic representations of a preferred embodiment of the invention. In the figures, identical or corresponding parts are represented with the same reference numerals.

DETAILED DESCRIPTION

Figure 1:
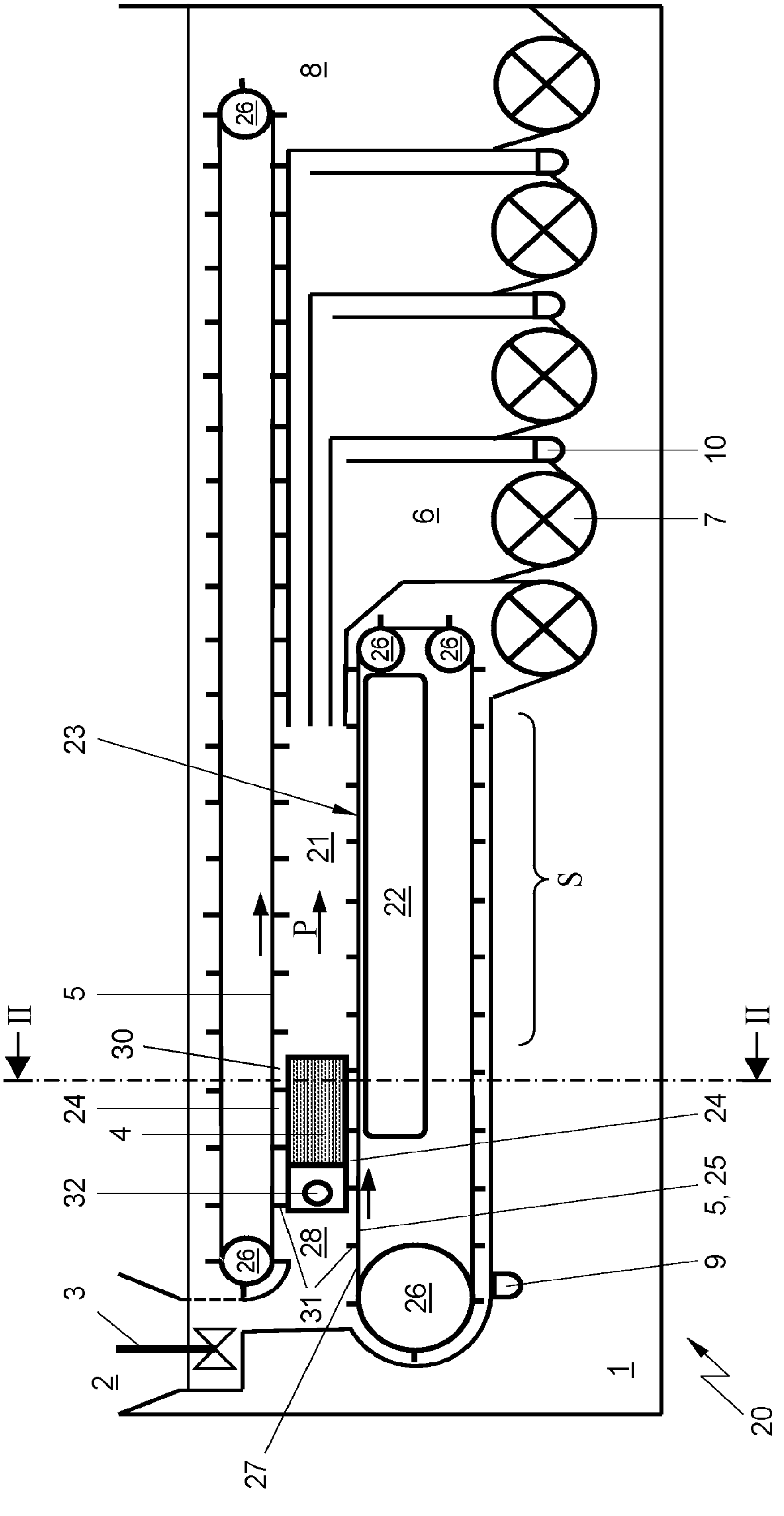
FIG. 1 shows a schematic cross sectional side view of a magnetic density separator.
Figure 2:
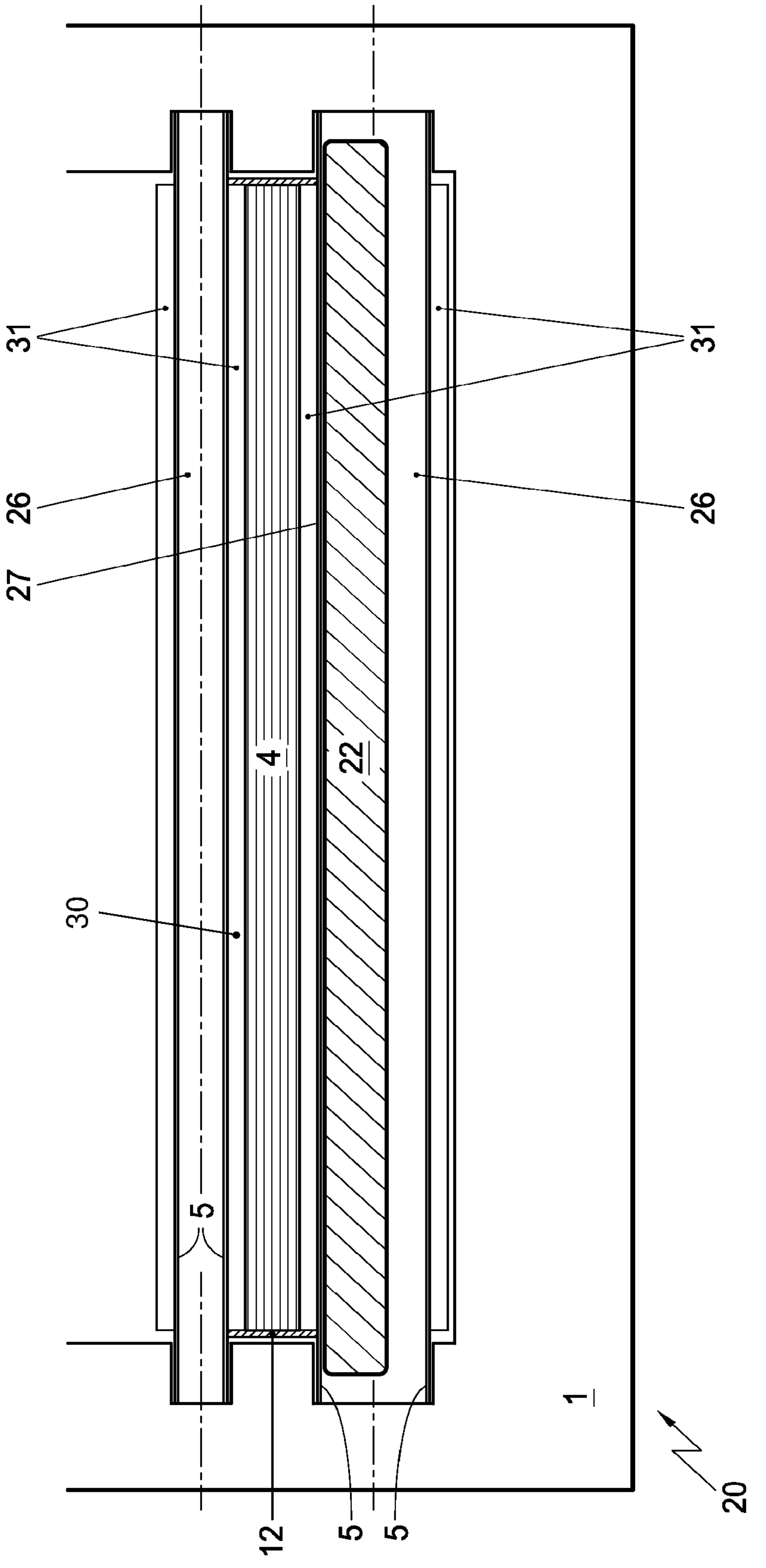
FIG. 2 shows a schematic cross sectional transversal view at A-A in FIG. 1.

FIGS. 1 and 2 show a magnetic density separator 20 comprising a process channel 21 through which in use magnetic process liquid and particles to be separated flow in a flow direction indicated with arrow P.

A magnetization device 22 is arranged to extend in flow direction along the bottom wall 23 of the channel 21 so as to in use apply a magnetic field to the process liquid in a separation zone of the channel 21. The magnetic field cuts the density of the magnetic process liquid to separate the particles in the process liquid based on their density.

The magnetization device 22 creates within the volume of magnetic liquid above the magnet a field with a substantially constant intensity in each plane parallel to the magnet. The result is that magnetic forces on the liquid are essentially perpendicular to these planes, and depend essentially only on the coordinate perpendicular to the plane. Such a magnet for magnetic density separation is discussed in more detail in "Magnet designs for magnetic density separation of polymers', The 25th conference on solid waste, technology and management, Mar. 27-30, 2011, Philadelphia, PA, USA, The journal of solid waste technology and management, ISSN 1091-8043 (2011) 977-983. In this publication, a planar magnet is described which includes a flat steel support, onto which a series of poles is mounted. The poles are alternately made from steel and from a magnetic material, and have a specially shaped cap made from steel. A gap filled with air or non-magnetic compound such as a polymer resin separates consecutive poles.

The separation device 20 further comprises a laminator 4 through which the magnetic process liquid is introduced into the channel 22 to flow laminarized in flow direction P along the separation zone S. The magnetic process liquid is stored in a reservoir 1, and is fed to the laminator via supply piping 32. In addition, the separation device comprises a feed 24 through which a mixture of process liquid and particles to be separated is introduced into the process channel to join the laminarized process liquid.

In accordance to the invention, the feed includes an entraining device 25. The entraining device may in use force particles in the mixture to the process channel 21 so that they do not get stuck and block the feed. The entraining device 25 extends at least partially through the process channel, along with the laminarized flow of process liquid such that the mixture of process liquid with particles moves with the entraining device 25, preferably with the same velocity as the entraining device 25 and/or in the same direction as the entraining device 25. In this embodiment, the entraining device comprises an endless, flat conveyor belt 5 that circulates between return wheels 26. As can be seen in FIG. 2, the conveyor belt 5 stretches across the width of the process channel 21. The top run 27 of the conveyor belt 5 extends along the laminator 4, and continues beyond the laminator 4 to extend over the magnetization device 22. The top run 27 of the conveyor belt 5 forms the bottom wall 23 of the process channel 21. It also forms the bottom wall of the feed 24. The length of the top run 27 of the conveyor belt 5 may be several meters, e.g. 2-6 m, and the width may be 0.5-3 m.

The entraining device 25 extends from a supply area 28 where process liquid and particles intermixed in turbulence. The particles to be separated are fed in wetted condition to the supply area via an inlet 2. In the supply area, the particles are intermixed with process liquid using a mixer 3 to form a slurryfied mixture. Air bubbles escape from the mixture towards the inlet 2.

The top run 27 of the conveyor belt 5 cooperates with the bottom wall 29 of the laminator 4 to form a feed channel 30 of the feed 24. The feed channel 30 is thus separate from the laminator 4, and the entraining 25 device is arranged to entrain the mixture axially through the feed channel, here in the same directions as the flow P.

The entraining device 25 includes entraining elements 31 that engage the walls of the feed channel so as to compartmentalize the mixture in the feed channel between the supply area and the process channel. The turbulent waves in the supply area 28 caused by the mixer 3 are blocked from propagating directly to the process channel 21. Here, the entraining elements are flexible riffles that extend upright form the conveyor face, and that sealingly engage the bottom wall 29 of the laminator 4. The entraining elements may here e.g. be 0.5-15 cm tall, for example 2 cm. The entraining elements 31 reach fully across the width of the conveyor belt, and are interspaced in flow direction P at e.g. 5-50 cm, for example 10 cm. The entraining elements form transport cradles between them that are open at a side facing the process channel. Swirls carried along in the transport cradle from the supply area 28 area may help the mixture to exit the cradle at the open side, and to merge the particles to be separated gently with the laminarized process liquid.

The process channel includes an exit zone comprising a number of dividing walls extending in flow direction, where the process liquid is divided into separate liquid streams in which the particles have mutually different average density.

In use, of the device discussed above, a magnetic field is applied the a magnetic process liquid comprising particles of different density, so as to establish a cut density of the magnetic process liquid and cause separation of the particles by their density. A mixture of magnetic process liquid with particles to be separated is joined to a laminarized flow of the magnetic process liquid using an entrainment device. The entrainment device moves along with the laminarized flow, preferably at substantially the same speed as the laminarized floe. This speed may e.g. be 0.1-0.5 msec. The entrainment device feeds the mixture from a supply area where process liquid and particles are intermixed in turbulence to the laminarized flow in compartmentalized flow.

EXAMPLE

In the following, an example is given based on the drawings.

Components:

1. Reservoir filled with magnetic process liquid
2. Inlet for wetted particles
3. Mixer to slurrify the particles and allow air bubbles to rise to the surface
4. Laminator with inlet (left) to create a homogeneous horizontal laminar flow of process liquid
5. Conveyors with flexible riffles for introducing the slurrified particles into the magnetic field/separation channel, both conveyors moving at the same speed as the horizontal laminar flow produced by the laminator
6. Vessels for separating the product flows into 1. a stream of particles that sink into a screw conveyor and are taken out from the separator to a washing unit, and 2. a stream consisting mainly of process liquid but including also some very fine materials, fibres and foils (particles with very small terminal velocities) moving with the flow of process liquid, that is sucked off by a pump. The rectangular bend at the outlet of the vessel guarantees that the suction flow at the splitters is homogeneous over the width of the separator
7. Screw conveyors to take out the products
8. Outlet for the lightest particles, possibly including also floating particles
9. Outlet for removing material sticking to the lower conveyor belt
10. Outlet for removing the flows of process liquid including also some very fine materials, fibres and foils to a pump and a filter. After filtration, the combined flows of process liquid are reintroduced into the reservoir 1 and then into the laminator section (4)
11. Flexible riffles A batch of 320 kg of mixed PET, PS, PE and PP waste is cut by a cutting mill with a screen of 10 mm.

The material is then submerged in boiling water for 30 seconds, in order to wet the surface of the flakes and minimize any biological activity of the material.

The material is fed, in the course of one hour, over a vibrating dewatering screen to cool down and reduce the water content to about 7 mass %, in order to minimize the amount of water being mixed with the plastics into the magnetic process liquid of the MDS.

From the dewatering screen, the material is fed into a mixing vessel of 400 mm wide, and 120 mm long, filled with magnetic process liquid to a level of 150 mm. The liquid in the vessel is being stirred by means of four spoon-shaped stirring devices with 30 mm diameter circular blades oriented perpendicular to the length of the vessel and 6 mm diameter vertical cylindrical rods, spaced 100 mm apart along the width of the vessel. The spoons are vibrated along the length of the vessel with a stroke of 20 mm and a frequency of between 2.5 and 10 Hz. The frequency is increased to the point that the plastic flakes are being suspended homogeneously in the liquid, while not so high that air is entrained from the surface of the liquid into the body of the liquid. It is found that by stirring the material in this way, the well-wetted flakes are introduced into the magnetic liquid homogeneously, individually (i.e., without sticking to each other) and without air bubbles, this being essential for their subsequent separation on density. Without stirring properly, the lightest flakes collect at the surface and block the feeding, while flakes of different polymers may stick to each other and enter the separator as clumps instead of individually.

A flow of magnetic process liquid of about 6 m3/h, introduced on the side and along the width of the mixing vessel and escaping through a drain in the bottom along its width, carries the suspended flakes through a guide of 30 mm×400 mm downwards into a channel of 400 mm width and 100 mm high, bounded by an upper conveyor belt and a lower conveyor belt, both running at 0.2 m/s, and two fixed side panes. Both conveyors belts are equipped with 20 mm high riffles, ca 100 mm apart. As a result of buoyancy and gravity, the flakes collect between the riffles of either conveyor belt.

The two conveyors entrain the material and the liquid at constant volumetric rate above and below a 60 mm high, 400 mm wide laminator unit, which injects a flow of liquid in between the two conveyors with the same speed, i.e., 0.2 m/s, into the magnetic field zone. This ensures that all materials, lighter or heavier than the process liquid, are introduced into the magnetic field zone in a liquid stream at very low turbulence.

Once in the magnetic field zone, the individual flakes will rise to their equilibrium height according to their density in a few seconds, while flowing towards the product outlets.

At the end of the channel, the flakes are collected into four different outlets, the first and lowest outlet bounded from above by a first splitter 20 mm above the lower conveyor belt collecting the PET product, the second, next lowest outlet bounded from above by a second splitter 30 mm above the first splitter collecting the PS product, the third outlet bounded from above by a third splitter 30 mm above the second splitter collecting the PE product, and a fourth outlet bounded by the upper conveyor and the third splitter collecting the PP product. The flows of liquid through the second and third outlets are being controlled by two pumps, each pumping about 9 m3/h.

The outlets that are bounded on one side by a conveyor release the material carried by the flow as the conveyors turn around their pulleys, towards the bottom and the surface of the tank, respectively, where the products are collected and transported from the tank by a screw conveyor. The middle two outlets each extend horizontally out of the magnetic field zone into a device which separates the flakes from the liquid by allowing the flakes to rise or fall from the horizontal flow into a container from which they are transported out of the tank. Thin foils, fine particles or fibres may flow with the liquid through the pumps.

The flows of liquid from the pumps are fed through a filter, to remove fine particles, fibres and foils, and are combined to be fed back into the laminator unit.

The invention is not limited to the exemplary embodiment represented here. For example, the conveyor may be of a chain type, and may carry sacks, plates or buckets as entrainment device. The entrainment device may also be formed by a rotating lock, similar to a revolving door. Such variations shall be clear to the skilled person and are considered to fall within the scope of the invention as defined in the following claims.

What is claimed:

1. A magnetic density separator comprising:

a process channel through which in use magnetic process liquid and particles to be separated flow in a flow direction, a magnetization device that is arranged to extend in the flow direction along at least one wall of the process channel so as to in use apply a magnetic field to the magnetic process liquid in a separation zone of the process channel to establish a cut density of the magnetic process liquid to separate the particles in the magnetic process liquid based on their density, a laminator through which the magnetic process liquid is introduced into the process channel to flow laminarized in the flow direction along the separation zone, and a feed channel through which a mixture of magnetic process liquid and particles to be separated is introduced into the process channel to join the laminarized magnetic process liquid;

wherein at least an end portion of the feed channel extends substantially parallel with at least an end portion of the laminator, such that the laminarized flow of magnetic process liquid introduced into the process channel by the laminator is introduced substantially parallel with the mixture introduced into the process channel by the feed channel; and wherein the feed channel includes an entraining device that comprises a conveyor with entraining elements that is arranged to move along the flow direction and that extends at least through the feed channel; and the conveyor includes a first conveyor belt above the laminator and a second conveyor belt below the laminator, and the feed channel is defined between a top of the laminator and a bottom of the first conveyor belt and between a bottom of the laminator and a top of the second conveyor belt.

2. The magnetic density separator according to claim 1, wherein the magnetic process liquid is fed to the laminator via a supply from a reservoir in which the magnetic process liquid is stored, and the mixture of process liquid and particles to be separated is fed to the process channel from a supply area, and wherein the mixture of process liquid and particles to be separated is fed to the process channel from the supply area via the feed channel to bypass the laminator.

3. The magnetic density separator according to claim 2, wherein in the supply area process liquid and particles are intermixed in turbulence.

4. The magnetic density separator according to claim 3, wherein the mixture of process liquid and particles to be separated is fed to the process channel from the supply area via the feed channel to bypass the laminator.

5. The magnetic density separator according to claims 1, wherein the feed channel is separate from the laminator, and wherein the entraining device is arranged to entrain the mixture axially through the feed channel.

6. The magnetic density separator according to claim 2, wherein the feed channel is separate from the laminator, and wherein the entraining device is arranged to entrain the mixture axially through the feed channel, and wherein the entraining elements engage walls of the feed channel so as to compartmentalize the mixture in the feed channel between the supply area and the process channel.

7. The magnetic density separator according to claim 1, wherein the entraining device comprises more than one conveyor arranged to move along the flow direction.

8. The magnetic density separator according to claim 1, wherein the entraining elements form transport cradles between them that are open at a side facing the process channel.

9. The magnetic density separator according to claim 7, wherein at least one conveyor of the more than one conveyor is an endless, flat conveyor belt, and wherein the entraining elements of the more than one conveyor comprise uprights extending from a conveying face of the conveyor belt.

10. The magnetic density separator according to claim 9, wherein the uprights comprise riffles extending transversely across the conveying face of the conveyor belt, interspaced in movement direction.

11. The magnetic density separator according to claim 1, wherein the feed channel is defined between the laminator and a process channel wall at an entrance of the process channel at the top and or bottom of the process channel.

12. The magnetic density separator according to claim 11, wherein the at least one conveyor extends along the wall of the process channel in flow direction, and wherein the entraining elements engage the wall of the laminator.

13. The magnetic density separator according claim 1, wherein the process channel includes an exit zone comprising at least one dividing wall extending in flow direction, where the process liquid is divided into separate liquid streams in which the particles have mutually different average density.

* * * * *